(12) United States Patent
Shimizu

(10) Patent No.: US 9,313,705 B2
(45) Date of Patent: Apr. 12, 2016

(54) DATA RELAY APPARATUS FOR TRANSFERRING DATA TO A MOBILE TERMINAL VIA A PLURALITY OF BASE STATIONS

(71) Applicant: FUJITSU LIMITED, Kawasaki-shi, Kanagawa (JP)

(72) Inventor: Masatsugu Shimizu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 14/096,366

(22) Filed: Dec. 4, 2013

(65) Prior Publication Data

US 2014/0094179 A1 Apr. 3, 2014

Related U.S. Application Data

(63) Continuation of application No. PCT/JP2011/063961, filed on Jun. 17, 2011.

(51) Int. Cl.
*H04W 36/02* (2009.01)
*H04L 1/00* (2006.01)
(Continued)

(52) U.S. Cl.
CPC ............ *H04W 36/023* (2013.01); *H04L 1/005* (2013.01); *H04L 1/0066* (2013.01); *H04L 47/34* (2013.01); *H04B 7/155* (2013.01); *H04L 1/1812* (2013.01);
(Continued)

(58) Field of Classification Search
CPC ... H04W 36/18; H04W 36/023; H04W 40/26; H04W 40/22; H04W 36/02; H04B 7/155; H04L 2001/0097; H04L 1/005; H04L 1/1812; H04L 2001/0093; H04L 2001/0092; H04L 2001/0096; H04L 2001/0098; H04L 1/0066; H04L 1/1614; H04L 1/02; H04L 47/34
See application file for complete search history.

(56) References Cited

U.S. PATENT DOCUMENTS

6,449,290 B1 * 9/2002 Willars et al. ............... 370/507
7,085,294 B2 * 8/2006 Longoni et al. ............. 370/509
(Continued)

FOREIGN PATENT DOCUMENTS

EP 2178335 A1 4/2010
JP 2001-508980 7/2001
(Continued)

OTHER PUBLICATIONS

KROA—Office Action of Korean Patent Application No. 10-2013-7032760 dated Mar. 19, 2015, with full English translation.
(Continued)

*Primary Examiner* — Meless Zewdu
(74) *Attorney, Agent, or Firm* — Fujitsu Patent Center

(57) ABSTRACT

When transmitting data from a data relay apparatus to a mobile station through a plurality of base stations, the plurality of base stations add sequence numbers to the data and transmits the data with the sequence number. The data relay apparatus transfers a first data and second data to the mobile station through different base stations among the plurality of base stations, in which the data relay apparatus transfers the first data received before the second data to one base station and transfers the second data while adding thereto information indicating the reception order of the first and second data. Each of the plurality of base stations, when the data transferred from the data relay apparatus contains the information added thereto, adds the sequence number to the data based on the information and transmits the data with the sequence numbers to the mobile station.

13 Claims, 13 Drawing Sheets

(51) Int. Cl.
    *H04L 12/801* (2013.01)
    *H04W 36/18* (2009.01)
    *H04B 7/155* (2006.01)
    *H04L 1/18* (2006.01)

(52) U.S. Cl.
    CPC . *H04L 2001/0093* (2013.01); *H04L 2001/0097* (2013.01); *H04W 36/18* (2013.01)

(56) References Cited

U.S. PATENT DOCUMENTS

| | | | |
|---|---|---|---|
| 2001/0046240 A1 | 11/2001 | Longoni et al. | |
| 2002/0145991 A1* | 10/2002 | Miya et al. | 370/337 |
| 2003/0035410 A1* | 2/2003 | Laroia et al. | 370/350 |
| 2007/0036106 A1* | 2/2007 | Karl et al. | 370/331 |
| 2007/0100115 A1* | 5/2007 | Schmid | B01J 2/04 528/128 |
| 2008/0069044 A1* | 3/2008 | Kimura et al. | 370/329 |
| 2008/0192682 A1* | 8/2008 | Matsumoto | H04B 7/0413 370/328 |
| 2009/0193310 A1* | 7/2009 | Hashimoto | 714/749 |
| 2009/0245166 A1* | 10/2009 | Okuda | 370/315 |
| 2009/0245201 A1* | 10/2009 | Motegi et al. | 370/331 |
| 2009/0296631 A1* | 12/2009 | Takahashi et al. | 370/328 |
| 2009/0296655 A1* | 12/2009 | Tamura | 370/331 |
| 2010/0039996 A1* | 2/2010 | Ohta et al. | 370/328 |
| 2010/0130208 A1 | 5/2010 | Hayashi et al. | |

FOREIGN PATENT DOCUMENTS

| | | |
|---|---|---|
| JP | 2002-530021 | 9/2002 |
| JP | 2008-072452 | 3/2008 |
| JP | 2009-296149 | 12/2009 |

OTHER PUBLICATIONS

JPOA—Office Action of Japanese Patent Application No. 2013-520393 dated Mar. 31, 2015, with English translation.
JPOA—Office Action of Japanese Patent Application No. 2013-520393 dated Sep. 1, 2015, with English Translation.
KROA—Office Action of Korean Patent Application No. 10-2013-7032760 dated Aug. 21, 2015, with English Translation.
Fujitsu; "Semi-continuous PDCP SN Approach"; 3GPP Draft; R2-074424; 3GPP TSG RAN WG2 Meeting #59bis Shanghai, Oct. 8-12, 2007; XP050136985.
EESR—Extended European Search Report of European Patent Application No. 11867779.8 dated May 29, 2015.
Gao Youjun et al., "The Access Network and Protocol Design for CoMP Technique in LTE-Advanced System"; 2010 6th International Conference on Wireless Communications Networking and Mobile Computing (WiCOM 2010), Sep. 23-25, 2010, paragraph 2, pp. 938-941.
International Search Report, mailed in connection with PCT/JP2011/063961 and mailed Jul. 12, 2011.

* cited by examiner

DATA RELAY APPARATUS FOR TRANSFERRING DATA TO A MOBILE TERMINAL VIA A PLURALITY OF BASE STATIONS

CROSS-REFERENCE TO RELATED APPLICATION

This application is a continuation application based on International Application PCT/JP2011/063961, filed on Jun. 17, 2011, the entire contents being incorporated herein by reference.

FIELD

The embodiments which are discussed in this Description relate to a transfer of downlink data in a wireless communication system.

BACKGROUND

In wireless communication, repeat control is performed to deal with data loss in a channel. If repeat control is performed, sometimes the order of arrival of data will differ from the order of sending. For this reason, the reception apparatus refers to the sequence numbers which are assigned to the data so as to correct the order of the received data.

Further, the art is being studied of simultaneously transferring different data to the same mobile terminal through different base stations. As an example of art which enables such transfer, there is an Inter-eNB carrier aggregation or coordinated multipoint (CoMP) art. The Inter-eNB carrier aggregation is the art of simultaneously receiving different data from different base stations through a plurality of carriers.

Note that, the communication method is known for sending data, to which transmission order numbers have been added, from a mobile station to a wireless network control apparatus through a plurality of base stations. With this method, the wireless network control apparatus monitors the statuses of communication of the different routes and uses the monitored statuses of communication of the different routes as the basis to decide whether to send all of the data through the plurality of routes, send data to a predetermined two or more routes, or send data to a predetermined single route. The wireless network control apparatus notifies the decided routes to a mobile station, then the mobile station sends different data to the notified routes with transmission order numbers attached. The wireless network control apparatus rearranges the data received from the different routes with reference to the transmission order numbers and transmits the rearranged data to a core network.

RELATED ART LIST

Patent Document 1: Japanese Laid-Open Patent Publication No. 2008-72452

When transferring a series of different data to the same mobile terminal simultaneously through different base stations, if the base stations independently attach sequence numbers to the transferred data, the sequence numbers which are imparted to a series of data may sometimes not match with the inherent order. As a result, the mobile terminal cannot suitably receive the data with the correct order.

SUMMARY

According to one aspect of an apparatus, there is provided a communication system which transfers data through a plurality of base stations from a data relay apparatus to a mobile terminal during which the plurality of base stations add sequence numbers to the data which they transfer to the mobile terminal. The data relay apparatus is provided with a first processor which performs processing to transfer first data and second data, which are received from a network and addressed to the mobile terminal, to different base stations among the plurality of base stations during which it transfers the first data received earlier than the second data to one base station and adds information which relates to the order of reception of the first data and second data to the second data which it then transfers to other base station. Each of the plurality of base stations is provided with a second processor which performs processing to add sequence numbers based on the above information to the data transferred to the mobile terminal when the above information is added to data transferred from the data relay apparatus. The mobile terminal is provided with a receiving unit which receives data transferred from the plurality of base stations.

Further, according to another aspect of an apparatus, there is provided a communication system which transfers data to a mobile terminal, connected to a plurality of base stations, from a data relay apparatus. The data relay apparatus is provided with a processor which performs processing to transfer first data and second data, different from the first data, which are received from a network and addressed to the mobile terminal, to different base stations among the plurality of base stations during which it reflects the order of reception of the first data and second data to these first data and second data, transfers the first data to one base station, and transfers the second data to the other base station. The mobile terminal is provided with a receiving unit which receives the first data through one base station and receives the second data through the other base station.

According to still another aspect of an apparatus, there is provided a data relay apparatus in a communication system which transfers data through a plurality of base stations from a data relay apparatus to a mobile terminal during which the plurality of base stations add sequence numbers to the data which they transfer to the mobile terminal. The data relay apparatus is provided with a processor which performs processing to transfer first data and second data, received from a network and addressed to the mobile terminal, to different base stations among the plurality of base stations during which it transfers the first data received earlier than the second data to one base station and adds information relating to the order of reception of the first data and second data to the second data which it transfers to the other base station.

According to still another aspect of an apparatus, there is provided a base station in a communication system which transfers data through a plurality of base stations from a data relay apparatus to a mobile terminal during which the plurality of base stations add sequence numbers to the data which they transfer to the mobile terminal. The base station is provided with a processor which performs processing, according to information relating to the order of reception of first data and second data, addressed to the mobile terminal from a network, to add a sequence number to the second data, received from the data relay apparatus and transferred to that base station after the first data, and transfer it to the mobile terminal.

According to still another aspect of an apparatus, there is provided a mobile terminal in a communication system which transfers data through a plurality of base stations from a data relay apparatus to a mobile terminal during which the plurality of base stations adds sequence numbers to the data which they transfer to the mobile terminal. The mobile terminal is provided with a receiving unit which receives first data to which one base station has added a sequence number, among first data and second data which are received by the data relay apparatus from a network, and receives second data to which the other base station has added a sequence number and a processor which uses the sequence numbers which have been added to the first data and second data as the basis to correct the order of data. The first data is data which is received by the data relay apparatus from the network before the second data and which is addressed to the mobile terminal, while the sequence number which is added to the second data is a sequence number which is based on information relating to the order of reception of the first data and second data in the data relay apparatus.

According to an aspect of the method, there is provided a communication method which transfers data through a plurality of base stations from a data relay apparatus to a mobile terminal during which the plurality of base stations add sequence numbers to the data which they transfer to the mobile terminal. The data relay apparatus performs processing to transfer first data and second data to different base stations among the plurality of base stations during which it transfers the first data received earlier than the second data to one base station and adds information relating to the order of reception of the first data and second data to the second data which it transfers to the other base station. Each of the plurality of base stations adds sequence numbers based on the above information to the data which it transfers to the mobile terminal, when the above information is added to data transferred from the data relay apparatus. The mobile terminal receives data transferred from the plurality of base stations.

The object and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF EMBODIMENTS

According to the disclosed apparatuses and methods, when transferring a series of different data through different base stations to the same mobile terminal, the continuity of the sequence numbers which are imparted to the transferred data by the base stations is maintained.

1. Configuration of Communication System

Figure 1:
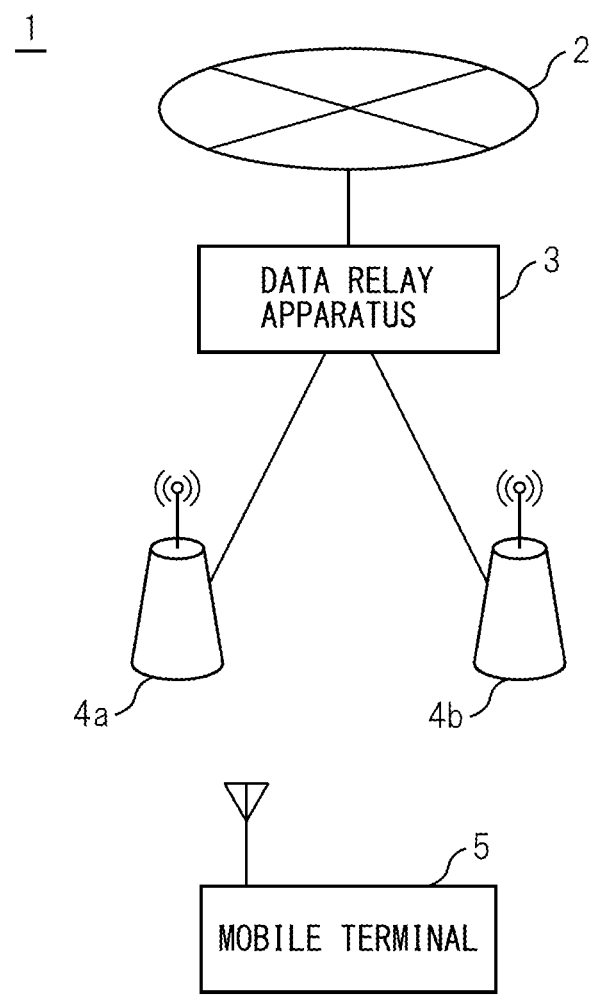
FIG. 1 is a view which illustrates one example of the overall configuration of a communication system.

Below, preferred embodiments will be explained with reference to the attached drawings. FIG. 1 is a view which illustrates an example of the overall configuration of a communication system. The communication system 1 is provided with a network 2, a data relay apparatus 3, base stations 4a and 4b, and a mobile terminal 5. The network 2 is a network for transferring data, through wired regions, which the communication system 1 sends and receives with the mobile terminal 5. The data relay apparatus 3 receives data to be transmitted from the network 2 to the mobile terminal 5 and transfers the data to the base stations 4a and 4b. Further, the data relay apparatus 3 receives data, from the base stations 4a and 4b, which is to be transmitted from the mobile terminal 5 to the network 2 and transfers the data to the network 2.

The base stations 4a and 4b communicate with the mobile terminal 5 through wireless communication channels, receive data, from the data relay apparatus 3, which is to be transmitted from the network 2 to the mobile terminal 5, and transmits the data to the mobile terminal 5. Further, the data base stations 4a and 4b receive data, from the mobile terminal 5, which is to be transmitted from the mobile terminal 5 to the network 2 and transfers the data to the data relay apparatus 3. Note that, in the following explanation, the base stations 4a and 4b will sometimes be referred to all together as the "base stations 4".

The communication system 1, for example, may be a communication system based on the LTE (long-term evolution)-Advanced scheme whose specifications are being considered at the 3GPP (3rd Generation Partnership Project). In this case, for example, the network 2 would correspond to a core network which relays data between a public network and a wireless access network. Further, the data relay apparatus 3 would correspond to a S-GW (Serving Gateway) and MME (Mobility Management Entity). The S-GW and MME may be realized by separate data processing systems or may be realized by a single data processing system.

2. Configuration of Mobile Terminal

Figure 2:
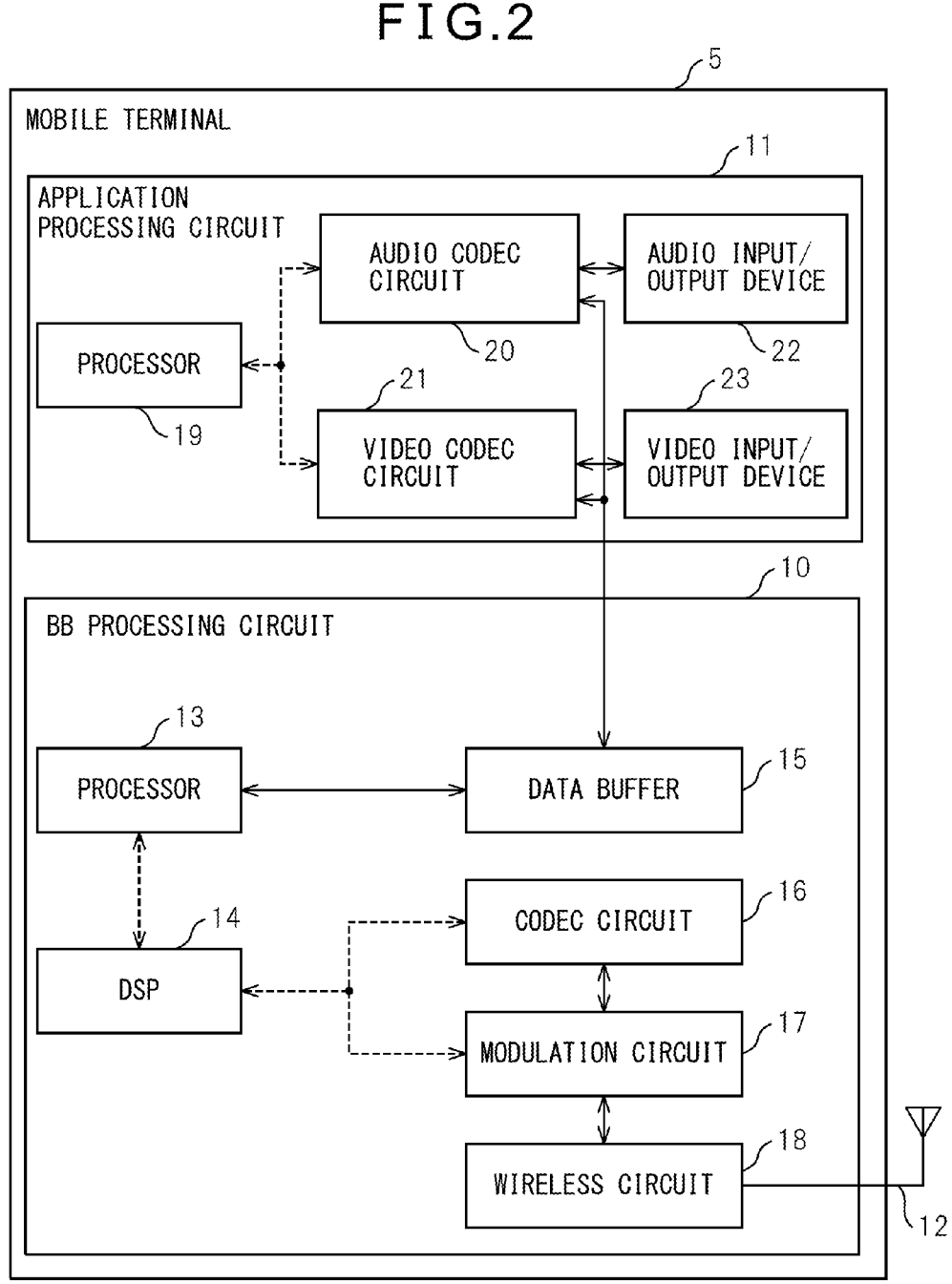
FIG. 2 is a view which illustrates one example of the hardware configuration of a mobile terminal.

FIG. 2 illustrates one example of the hardware configuration of the mobile terminal 5. The mobile terminal 5 is provided with a baseband processing circuit 10, application processing circuit 11, and antenna 12. The baseband processing circuit 10 is provided with a processor 13, digital signal processor 14, data buffer 15, codec circuit 16, modulation circuit 17, and wireless circuit 18. The application processing circuit 11 is provided with a processor 19, audio codec circuit 20, video codec circuit 21, audio input/output device 22, and video output device 23. In the drawing, the connecting lines which are drawn by broken lines illustrate the transfer of control information. Further, the connecting lines which are drawn by solid lines illustrate the transfer of data. Further, in the attached drawings, the baseband and digital signal processing processor are respectively indicated as "BB" and "DSP". The hardware configuration which is illustrated in FIG. 2 is one example of the hardware configuration which realizes the mobile terminal 5. If executing the processing described below in this Description, another different hardware configuration may also be used.

The codec circuit 16 performs encoding processing and decoding processing in the layer 1 processing for a signal which is sent and received between the mobile terminal 5 and the base stations 4. The modulation circuit 17 performs modulation processing and demodulation processing in the layer 1 processing. The digital signal processor 14 controls these codec circuit 16 and modulation circuit 17. The wireless circuit 18 performs conversion between a digital baseband signal and an analog wireless frequency signal. The processor 13 performs layer 3 processing and layer 2 processing. The data buffer 15 stores transmitted/received data and relays the transmitted/received data between the baseband processing circuit 10 and the application processing circuit 11. Further, the processor 13 manages the status of call connections.

The audio codec circuit 20 performs signal processing for the audio signal which is sent and received between the mobile terminal 5 and the base stations 4. The audio signal is input and output by the audio input/output device 22. The video codec circuit 21 performs signal processing for the video signal which is sent and received between the mobile terminal 5 and the base stations 4. The video signal is input and output by the video input/output device 23. The processor 19 controls these audio codec circuit 20 and video codec circuit 21.

Figure 3:
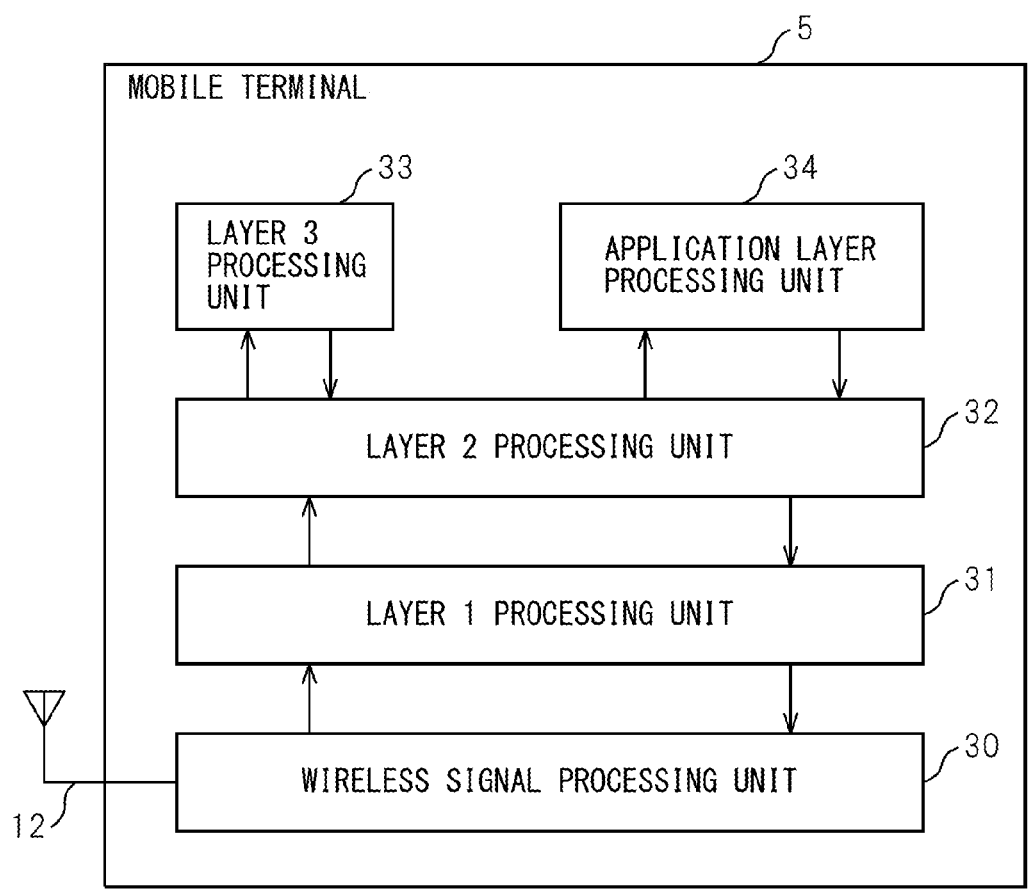
FIG. 3 is a view which illustrates an example of the configuration of a mobile terminal.

FIG. 3 is a view which illustrates an example of the configuration of the mobile terminal 5. The mobile terminal 5 is provided with a wireless signal processing unit 30, layer 1 processing unit 31, layer 2 processing unit 32, layer 3 processing unit 33, and application layer processing unit 34. The signal processing by the wireless signal processing unit 30 is performed by the wireless circuit 18 which is illustrated in FIG. 2. The processing by the layer 1 processing unit 31 is performed by the digital signal processor 14, codec circuit 16, and modulation circuit 17. The processings by the layer 2 processing unit 32 and the layer 3 processing unit 33 are performed by the processor 13. The processing in an application layer processing unit 34 is performed by the application processing circuit 11.

The wireless signal processing unit 30 converts the wireless frequency signal which is received by the antenna 12 to a baseband signal. Further, the wireless signal processing unit 30 converts a baseband signal which is generated by the mobile terminal 5 to a wireless frequency signal which is to be transmitted through the antenna 12.

Figure 4:
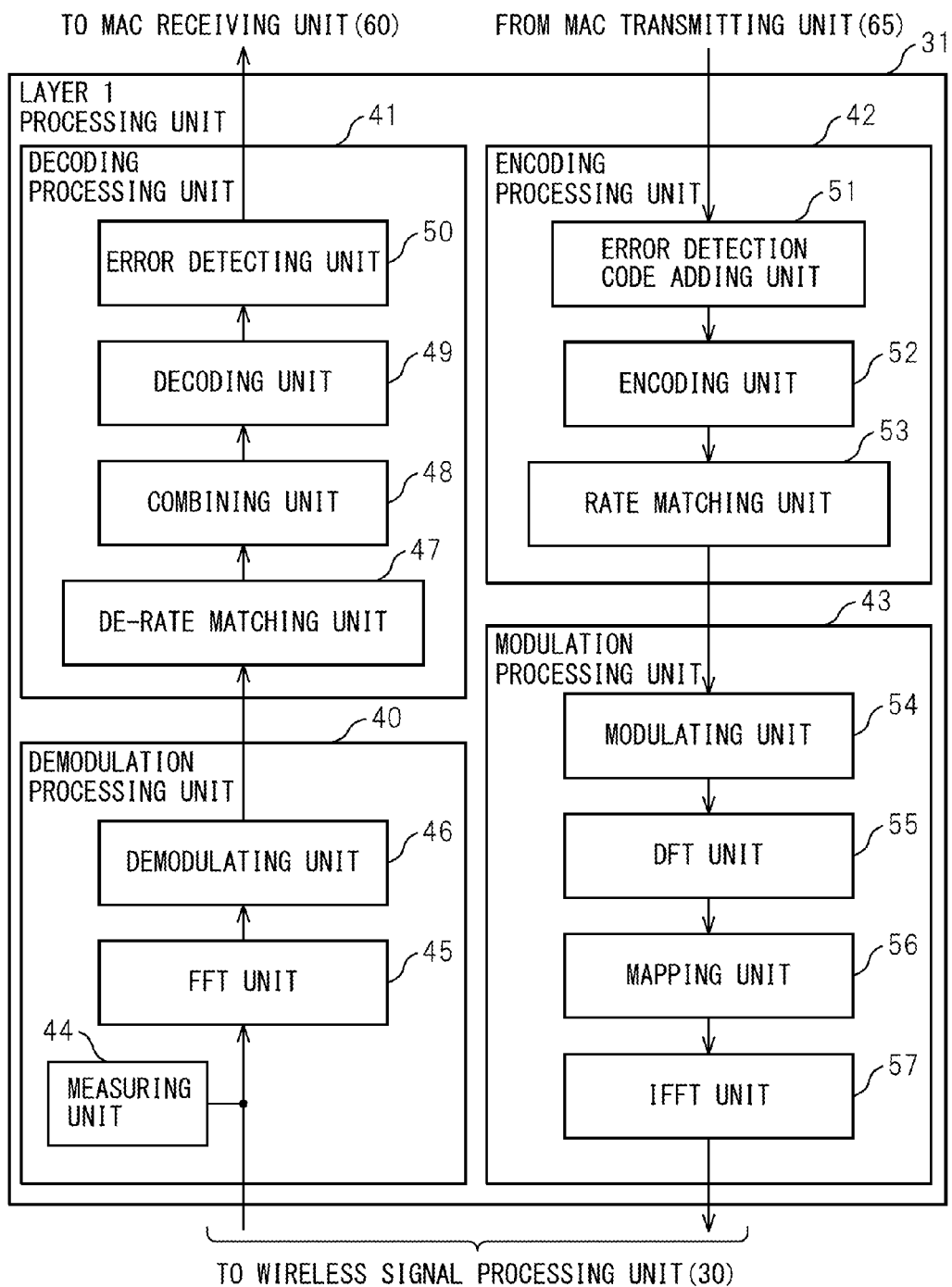
FIG. 4 is a view which illustrates an example of the configuration of a layer 1 processing unit illustrated in FIG. 3.

An example of the configuration of the layer 1 processing unit 31 is illustrated in FIG. 4. The layer 1 processing unit 31 is provided with a demodulating processing unit 40, decoding processing unit 41, encoding processing unit 42, and modulation processing unit 43. The demodulating processing unit 40 performs demodulation processing for the signal which the wireless signal processing unit 30 receives. For example, the demodulating processing unit 40 may perform demodulation processing by OFDMA (orthogonal frequency division multiple access). In this case, the demodulating processing unit 40 is provided with a measuring unit 44, fast Fourier transform unit 45, and demodulating unit 46. Note that, in the attached figures, fast Fourier transform is indicated as "FFT". The measuring unit 44 performs a cell search and measurement of the level of a received signal. The fast Fourier transform unit 45 applies a Fourier transform to the received signal to reconstruct the subcarrier symbols. The demodulating unit 46 applies demodulation processing on the subcarrier symbols, i.e., primary modulation signal and reconstructs the encoded data.

The decoding processing unit 41 performs decoding processing for the reconstructed encoded data. The decoding processing unit 41 is provided with a de-rate matching unit 47, combining unit 48, decoding unit 49, and error detecting unit 50. The de-rate matching unit 47 reconstructs data which is adjusted in size in accordance with the allocated physical channel resources. The combining unit 48 composes repeat data by HARQ (hybrid automatic repeat request) or other repeat processing. The decoding unit 49, for example, performs turbo decoding processing to reconstruct the encoded data. The error detecting unit 50 performs error detection processing for the decoded data.

The encoding processing unit 42 performs encoding processing for the transmitted signal. The encoding processing unit 42 is provided with an error detection code adding unit 51, an encoding unit 52, and a rate matching unit 53. The error detection code adding unit 51 calculates a CRC (cyclic redundancy checking) code or other error detection code and adds it to the transmitted data. The encoding unit 52 encodes the data by, for example, a turbo encoding processing. The rate matching unit 53 adjusts the encoded data in size according to the allocated physical channel resources.

The modulation processing unit 43 performs modulation processing for the encoded data. For example, the modulation processing unit 43 may perform the modulation processing by the SC-FDMA (single carrier frequency division multiple access) scheme. In this case, the modulation processing unit 43 is provided with a modulating unit 54, discrete Fourier transform unit 55, mapping unit 56, and inverse fast Fourier transform unit 57. The modulating unit 54 applies a primary modulation processing such as a multivalue modulation to the encoded data. The discrete Fourier transform unit 55 applies a discrete Fourier transform to the multivalue modulated symbols so as to generate a frequency domain signal of a single carrier having relatively broad band. The mapping unit 56 maps a frequency domain signal on a subcarrier of a physical channel resource which is allocated by the base station 4. The inverse fast Fourier transform unit 57 applies an inverse fast Fourier transform to the frequency domain signal which is allocated in the subcarrier. Note that, in the attached drawings, "discrete Fourier transform" and "inverse fast Fourier transform" are indicated as "DFT" and "IFFT". The signal which is modulated by the modulation processing unit 43 is sent by the wireless signal processing unit 30.

Figure 5:
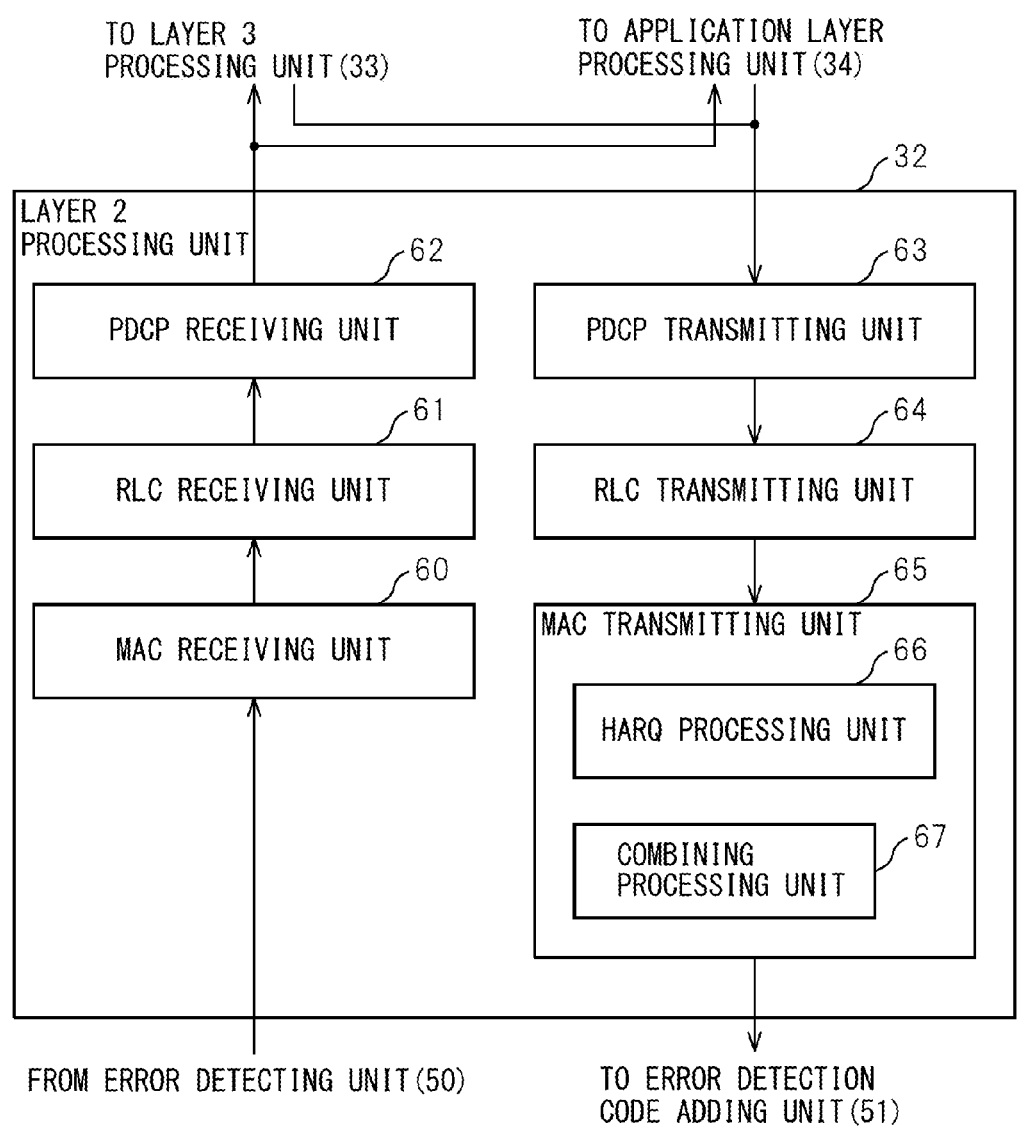
FIG. 5 is a view which illustrates an example of the configuration of a layer 2 processing unit illustrated in FIG. 3.

An example of the configuration of the layer 2 processing unit 32 illustrated in FIG. 3 is shown in FIG. 5. Note that, in the attached drawings and in the following explanation, medium access control, wireless link control, and packet data convergence protocol are indicated as "MAC", "RLC", and "PDCP", respectively. The layer 2 processing unit 32 is provided with a MAC receiving unit 60, RLC receiving unit 61, PDCP receiving unit 62, PDCP transmitting unit 63, RLC transmitting unit 64, and MAC transmitting unit 65.

The MAC receiving unit 60 separates data, which is received from the error detecting unit 50 of the layer 1 processing unit 31, into respective logical channels and outputs the separated data to the RLC receiving unit 61. The RLC receiving unit 61 rearranges the data, which is received from the MAC receiving unit 60, in the order transmitted and transfers the rearranged data to the PDCP receiving unit 62. The PDCP receiving unit 62 arranges the data, which is received from the RLC receiving unit 61, in the order of the sequence numbers which are added to the data and then outputs the arranged data to the layer 3 processing unit 33 and application layer processing unit 34.

The PDCP transmitting unit 63 allocates sequence numbers to data which is received from the layer 3 processing unit 33 and application layer processing unit 34 and then transfers the data to the RLC transmitting unit 64. The RLC transmitting unit 64 sends the data, which is received from the PDCP transmitting unit 63, to the MAC transmitting unit 65 by repeat control processing. The MAC transmitting unit 65 combines the data which is received from the RLC transmitting unit 64 for the respective logical channels and then outputs the result to the error detection code adding unit 51 of the layer 1 processing unit 31. The MAC transmitting unit 65 is provided with a HARQ processing unit 66, which performs HARQ processing for the transmitted signal, and a combining processing unit 67 which combines the data of respective logical channels.

Refer to FIG. 3. The layer 3 processing unit 33 performs control of the wireless resources and control of the mobile terminal 5 as a whole. The layer 3 processing unit 33 performs RRC (Radio Resource Control) connection control such as paging and call establishment and release processing. Further, the layer 3 processing unit 33 performs measurement control for managing and reporting of the measurement. For example, the layer 3 processing unit 33 may measure the amount of traffic which the mobile terminal 5 handles and report it to the base stations 4. The layer 3 processing unit 33 performs mobility control which performs handover or reselection or other connection switching control.

The application layer processing unit 34 manages the user data in accordance with the purpose of communication by the user.

3. Configuration of Base Stations

Figure 6:
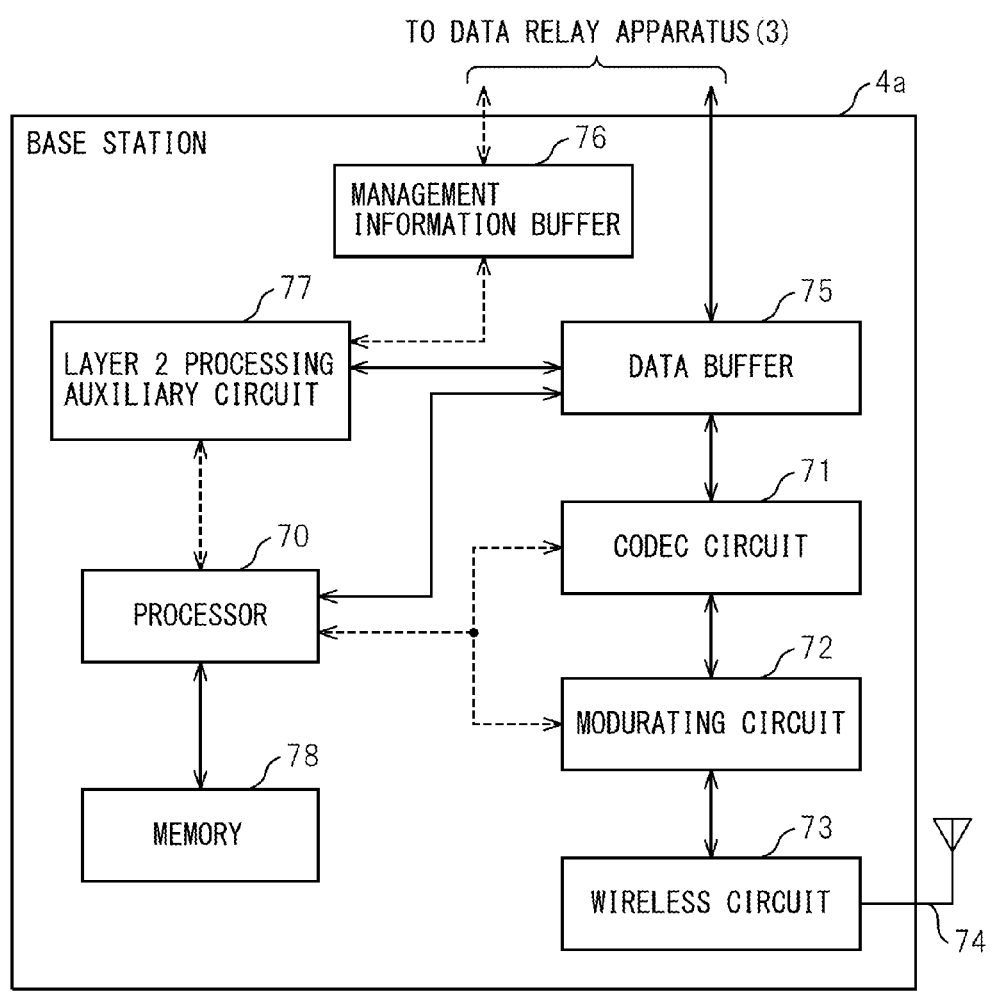
FIG. 6 is a view which illustrates an example of the hardware configuration of a base station.

Next, the configuration of the base stations 4 will be explained. FIG. 6 is a view which shows an example of the hardware configuration of the base station 4a. The base station 4b is similarly configured. The base station 4a is provided with a processor 70, codec circuit 71, modulation circuit 72, wireless circuit 73, antenna 74, data buffer 75, management information buffer 76, and layer 2 processing auxiliary circuit 77. In the drawings, the connection lines which are drawn by broken lines illustrate the transfer of control information. Further, the connection lines which are drawn by solid lines illustrate the transfer of data. The hardware configuration which is illustrated in FIG. 6 is one example of the hardware configuration which realizes the base station 4a. If performing the processing which is described below in the Description, any other hardware configuration may also be employed.

The codec circuit 71 performs encoding processing and decoding processing in the layer 1 processing of the signal which is sent and received between the mobile terminal 5 and the base station 4a. The modulation circuit 72 performs modulation processing and demodulation processing in the layer 1 processing. The processor 70 performs control of these codec circuit 71 and modulation circuit 72, layer 2 processing, layer 3 processing, management of the statuses of connection of the users, resource allocation and scheduling processing. The layer 2 processing auxiliary circuit 77 performs part of the layer 2 processing. The wireless circuit 73 performs conversion between the digital baseband signal and analog wireless frequency signal. The data buffer 75 and management information buffer 76 stores the transmitted/received data and relays the transmitted/received data between the base station 4a and the data relay apparatus 3. The memory 78 stores the values of the sequence numbers which the PDCP sublayer of the base station 4a adds to the transmitted data.

Figure 7:
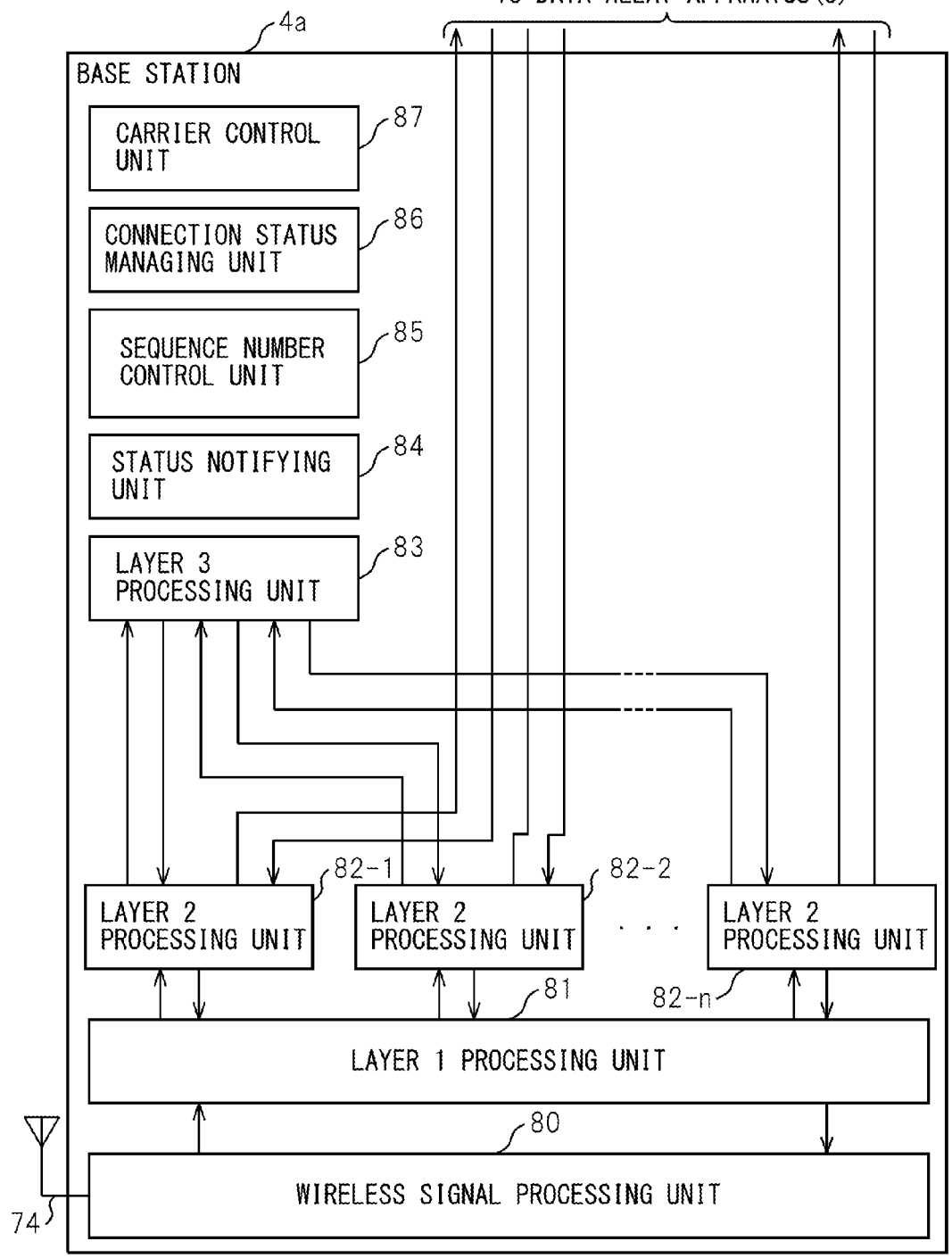
FIG. 7 is a view which illustrates an example of the configuration of a base station.

FIG. 7 is a view which illustrates an example of the configuration of the base station 4a. The base station 4b is similarly configured. The base station 4a is provided with a wireless signal processing unit 80, layer 1 processing unit 81, layer 2 processing units 82-1 to 82-n, layer 3 processing unit 83, status notifying unit 84, sequence number control unit 85, connection status managing unit 86, and carrier control unit 87. In the following explanation, the plurality of layer 2 processing units 82-1 to 82-n will sometimes be referred to all together as the "layer 2 processing units 82".

The signal processing by the wireless signal processing unit 80 is performed by the wireless circuit 73 which is illustrated in FIG. 6. The processing by the layer 1 processing unit 81 is performed by the processor 70, codec circuit 71, and modulation circuit 72. The processing by the layer 2 processing unit 82 is performed by the processor 70 and layer processing auxiliary circuit 77. The processings by the layer 3 processing unit 83, status notifying unit 84, sequence number control unit 85, connection status managing unit 86, and carrier control unit 87 are performed by the processor 70.

The wireless signal processing unit 80 converts the wireless frequency signal which is received by the antenna 74 to a baseband signal. Further, the wireless signal processing unit 80 converts the baseband signal which is generated by the base station 4a to a wireless frequency signal, and the converted signal is then transmitted through the antenna 74.

Figure 8:
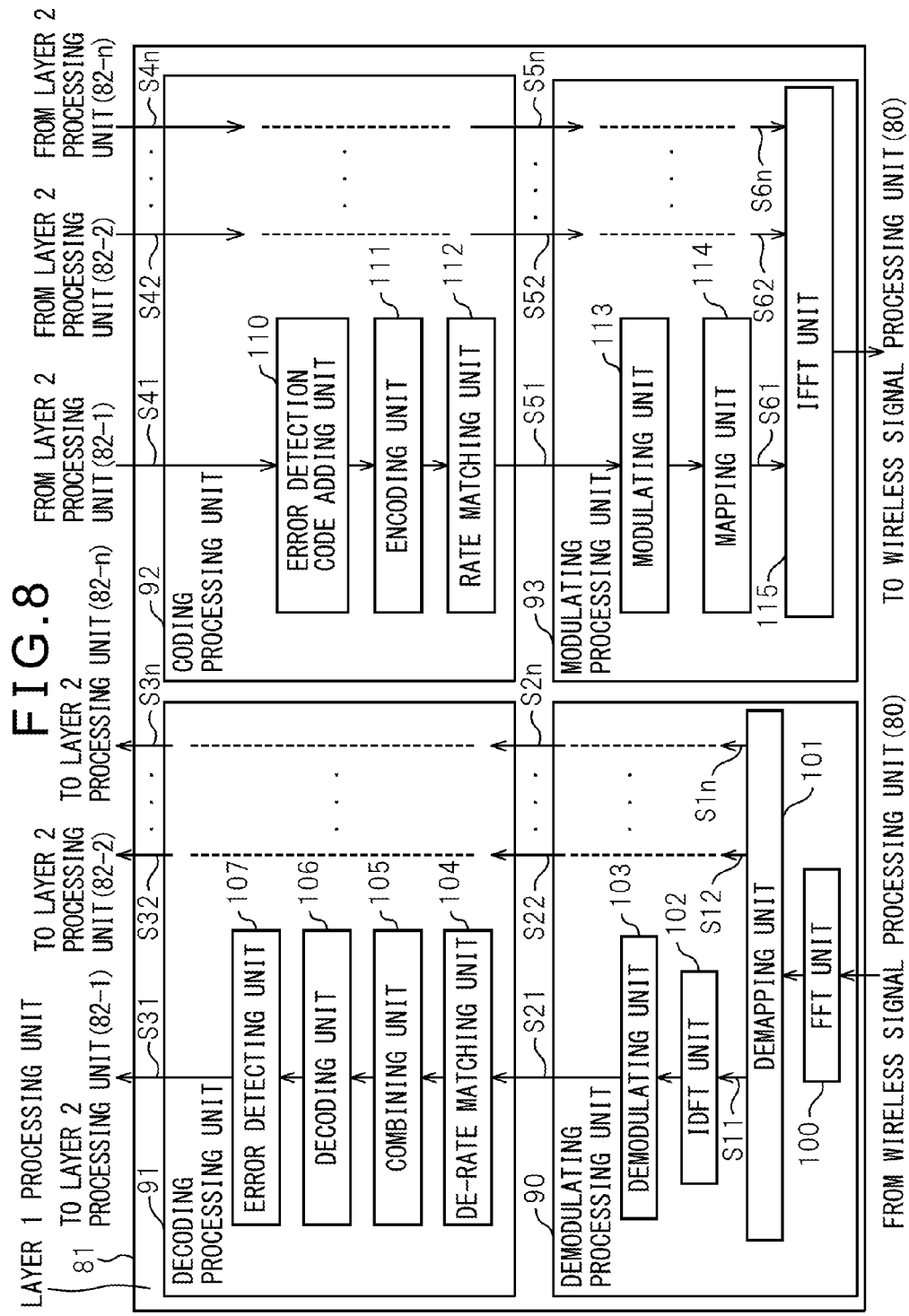
FIG. 8 is a view which illustrates an example of the configuration of a layer 1 processing unit illustrated in FIG. 7.

An example of the configuration of the layer 1 processing unit 81 is illustrated in FIG. 8. The layer 1 processing unit 81 is provided with a demodulating processing unit 90, decoding processing unit 91, encoding processing unit 92, and modulating processing unit 93. The demodulating processing unit 90 performs demodulation processing for the signal which the wireless signal processing unit 80 receives. For example, the demodulating processing unit 90 may perform demodulation processing by the SC-FDMA scheme. In this case, the demodulating processing unit 90 is provided with a fast Fourier transform unit 100, demapping unit 101, inverse discrete Fourier transform unit 102, and demodulating unit 103. Note that, in the attached drawings, the inverse discrete Fourier transform is indicated as "IDFT".

The fast Fourier transform unit 100 converts the received signal of the received time domain signal to a frequency domain signal so as to reconstruct the subcarrier symbols. The demapping unit 101 divides the symbols which are mapped in the subcarriers to symbols S11 to S1n for the respective users. The inverse discrete Fourier transform unit 102 applies an inverse discrete Fourier transform to the frequency domain signal of a single carrier, that is, the subcarrier symbols S11 to S1n for the users, so as to reconstruct the primary modulation signals for the respective users. The demodulating unit 46 applies demodulation processing to the primary demodulation signal and reconstructs the encoded data S21 to S2n for the individual users.

The decoding processing unit 91 performs decoding processing for the encoded data S21 to S2n of the individual users and reconstructs the encoded data S31 to S3n for the individual users. The decoding processing unit 91 is provided with a de-rate matching unit 104, combining unit 105, decoding unit 106, and error detecting unit 107. The processings of the de-rate matching unit 104, combining unit 105, decoding unit 106, and error detecting unit 107 are similar to the processings of the de-rate matching unit 47, combining unit 48, decoding unit 49, and error detecting unit 50 as explained above. The data S31 to S3n are output to the layer 2 processing units 82-1 to 82-n, respectively.

The encoding processing unit 92 encodes the data S41 to S4n of the individual users which are input from the layer 2 processing units 82-1 to 82-n, respectively, and generates the encoded data S51 to S5n for the respective users. The encoding processing unit 92 is provided with an error detection code adding unit 110, encoding unit 111, and rate matching unit 112. The processings of the error detection code adding unit 110, encoding unit 111, and rate matching unit 112 are similar to the processings of the error detection code adding unit 51, encoding unit 52, and rate matching unit 53 as explained above.

The modulating processing unit 93 performs the modulation processing for the encoded data S51 to S5n of the individual users. For example, the modulating processing unit 93 may perform the modulation processing by the OFDMA scheme. In this case, the modulating processing unit 93 is provided with a modulating unit 113, mapping unit 114, and inverse fast Fourier transform unit 115. The modulating unit 113 performs a primary modulation processing, such as a multivalue modulation, for the encoded data S51 to S5n of the individual users and generates the subcarrier symbols S61 to S6n. The mapping unit 114 maps the subcarrier symbols S61 to S6n in the subcarriers of the physical channel resources. The inverse fast Fourier transform unit 115 applies an inverse fast Fourier transform to the subcarrier symbols so as to generate a time domain signal. The signal which is modulated by the modulating processing unit 93 is transmitted by the wireless signal processing unit 80.

Figure 9:
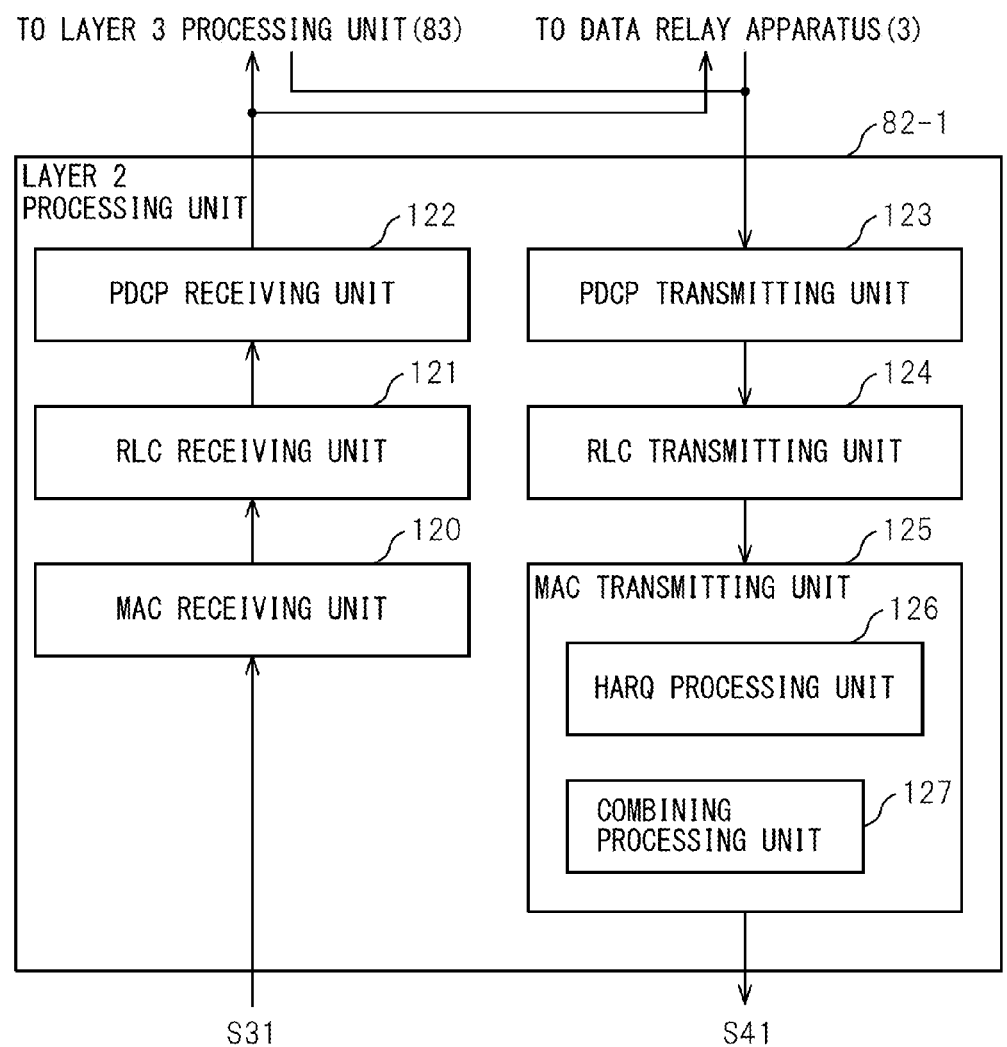
FIG. 9 is a view which illustrates an example of the configuration of a layer 2 processing unit illustrated in FIG. 7.

An example of the configuration of the layer 2 processing unit 82-1 is illustrated in FIG. 9. The layer 2 processing units 82-2 to 82-n are configured similar to the configuration of the layer 2 processing unit 82-1. The layer 2 processing units 82-1 to 82-n perform layer 2 processing relating to the data S31 to S3n and S41 to S4n of the individual users. The layer 2 processing unit 82-1 is provided with a MAC receiving unit 120, RLC receiving unit 121, PDCP receiving unit 122, PDCP transmitting unit 123, RLC transmitting unit 124, and MAC transmitting unit 125. Further, the MAC transmitting unit 125 is provided with a HARQ processing unit 126, and combining processing unit 127. The processings of the MAC receiving unit 120, RLC receiving unit 121, PDCP receiving unit 122, PDCP transmitting unit 123, RLC transmitting unit 124, and MAC transmitting unit 125 are similar to the processings of the MAC receiving unit 60, RLC receiving unit 61, PDCP receiving unit 62, PDCP transmitting unit 63, RLC transmitting unit 64, and MAC transmitting unit 65. The PDCP transmitting unit 123 performs processing for adding sequence numbers to the packet data which is received from the data relay apparatus 3, in the PDCP sublayer.

Refer to FIG. 7. The layer 3 processing unit 83 performs the control of the wireless resources and the RRC connection control. The status notifying unit 84 measures a predetermined status of the base station 4a and notifies it to the data relay apparatus 3. The "predetermined status" may, for example, be a state relating to the load of the base station 4a such as the amount of traffic which the base station 4a handles or the remaining capacity of the data buffer 75.

The sequence number control unit 85 may perform processing for synchronizing the values of the sequence numbers, which are stored in the memory 78, with the other base station 4b. For example, the sequence number control unit 85 responds to the sequence number request signal which is transmitted from the data relay apparatus 3 and transmits the values of the sequence numbers which are stored in the memory 78 to the data relay apparatus 3. Further, for example, the sequence number control unit 85 rewrites the values of the sequence numbers, which are stored in the memory 78, to designated values of the sequence numbers which are notified from the data relay apparatus 3.

Further, the sequence number control unit 85 may perform processing for designating the values of the sequence numbers to be stored in the memory 78 in accordance with basic information of sequence numbers which is transmitted from the data relay apparatus 3 along with the data to be transferred to the mobile terminal 5.

The connection status managing unit 86 manages the states of connection of the users connected to the base station 4a. The carrier control unit 87 performs resource allocation and scheduling processing. Further, the carrier control unit 87 performs processing for setting routes for transferring different data which is transmitted from the data relay apparatus 3 simultaneously through different base stations 4 to the same mobile terminal 5.

For example, the carrier control unit 87 notifies a route addition request to the other base station 4b. The route addition request requests that the other base station should perform the transfer processing as well for transferring transmitted data from the data relay apparatus 3 to the mobile terminal 5 being connected to the base station 4a. Further, the carrier control unit 87 judges if the route addition request notified from the other base station 4b is possible and notifies the response, that is, a route addition request response, to the other base station 4b. When performing data transfer processing according to the route addition request which is notified from the other base station 4b, the carrier control unit 87 notifies, to the other base station 4b, the setting of the physical channel for transferring data to the mobile terminal 5.

Furthermore, the carrier control unit 87 may adjust the physical channel resources which the base station 4a uses for transfer of data to the mobile terminal 5 and the physical channel resources which the other base station 4b uses for transfer of data to the mobile terminal 5. The carrier control unit 87, for example, keeps the base station 4a and the other base station 4b from competing in physical channel resources by performing resource allocation processing to make the wireless frequency, used for transfer of data to the mobile terminal 5, different.

4. Configuration of Data Relay Apparatus

Figure 10:
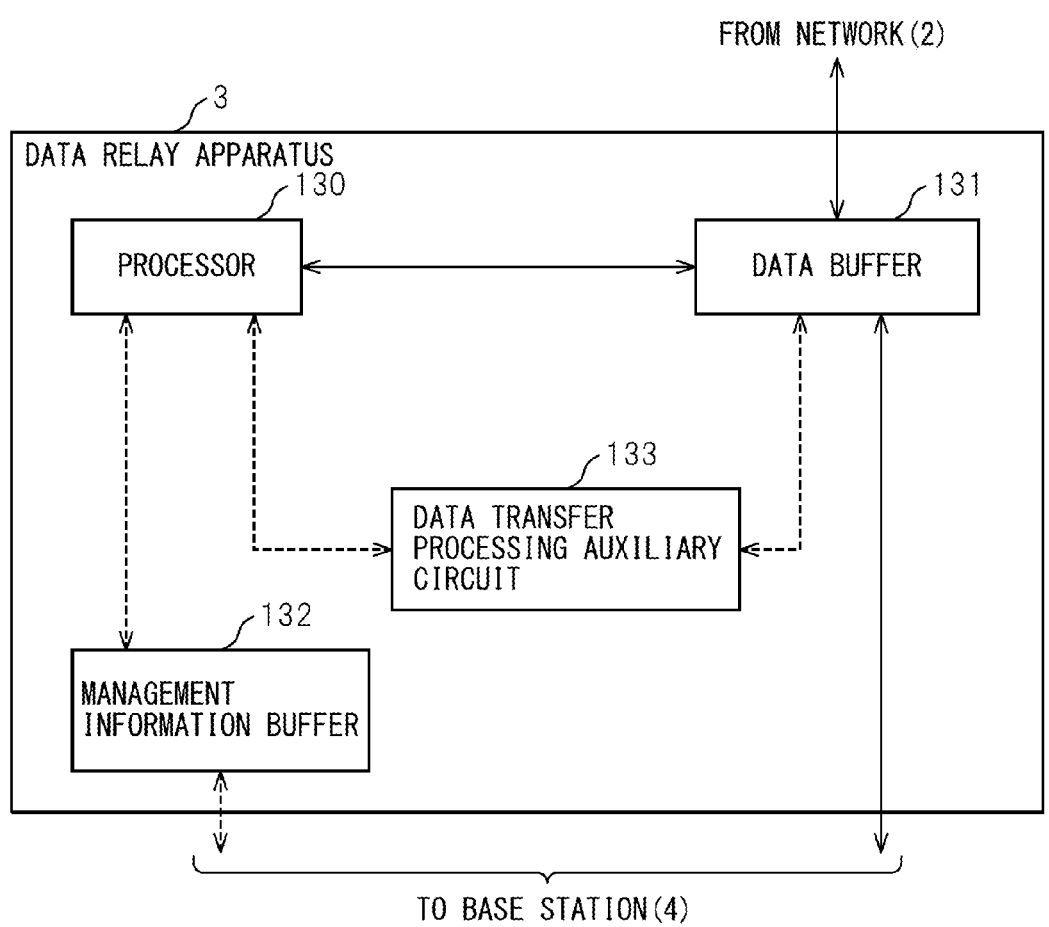
FIG. 10 is a view which illustrates an example of the hardware configuration of a data relay apparatus.

Next, the configuration of the data relay apparatus 3 will be explained. FIG. 10 is a view which illustrates one example of the hardware configuration of the data relay apparatus 3. The data relay apparatus 3 includes a processor 130, data buffer 131, management information buffer 132, and data transfer processing auxiliary circuit 133. In the drawing, the connecting lines which are drawn by broken lines illustrate the transfer of control information. Further, the connecting lines which are drawn by solid lines illustrate the transfer of data. The hardware configuration which is illustrated in FIG. 10 is one example of the hardware configuration which realizes the data relay apparatus 3. If executing the processing described below in this Description, another different hardware configuration may also be used.

The processor 130 performs user mobility processing to manage route information relating to the routes which can be selected for transferring data to the respective mobile terminals 5. The management information buffer 132 stores the route information. Further, the processor 130 performs transfer route judgment processing for judging to which base station 5 the data for the mobile terminal 5 is to be transferred. Further, it monitors a notification relating to a predetermined status to be reported from the base stations 4. The processor 130 judges the transfer route in accordance with the predetermined status of the base stations 4. Further, the processor 130 performs processing for managing the sequence numbers which are added to the transfer data, in the PDCP sublayer.

The data buffer 131 and management information buffer 132 store the transmitted/received data and relay the transmitted/received data between the base station 4a and the data relay apparatus 3. The data transfer processing auxiliary circuit 133 assists the transfer of data between the base stations 4 and the data relay apparatus 3. For example, the data transfer processing auxiliary circuit 133 may be hardware for transferring, to the base stations 4, the data and necessary information, when the head address of the storage region, at which the transfer data is stored, the size and the parameter used for transfer are designated.

Note that, the data relay apparatus 3 may be realized as a single data processing system or may be realized as a plurality of data processing systems. For example, when the data relay apparatus 3 is an S-GW and MME, the S-GW and MME may be realized by a single data processing system integrally or may be realized by respective data processing systems.

Figure 11:
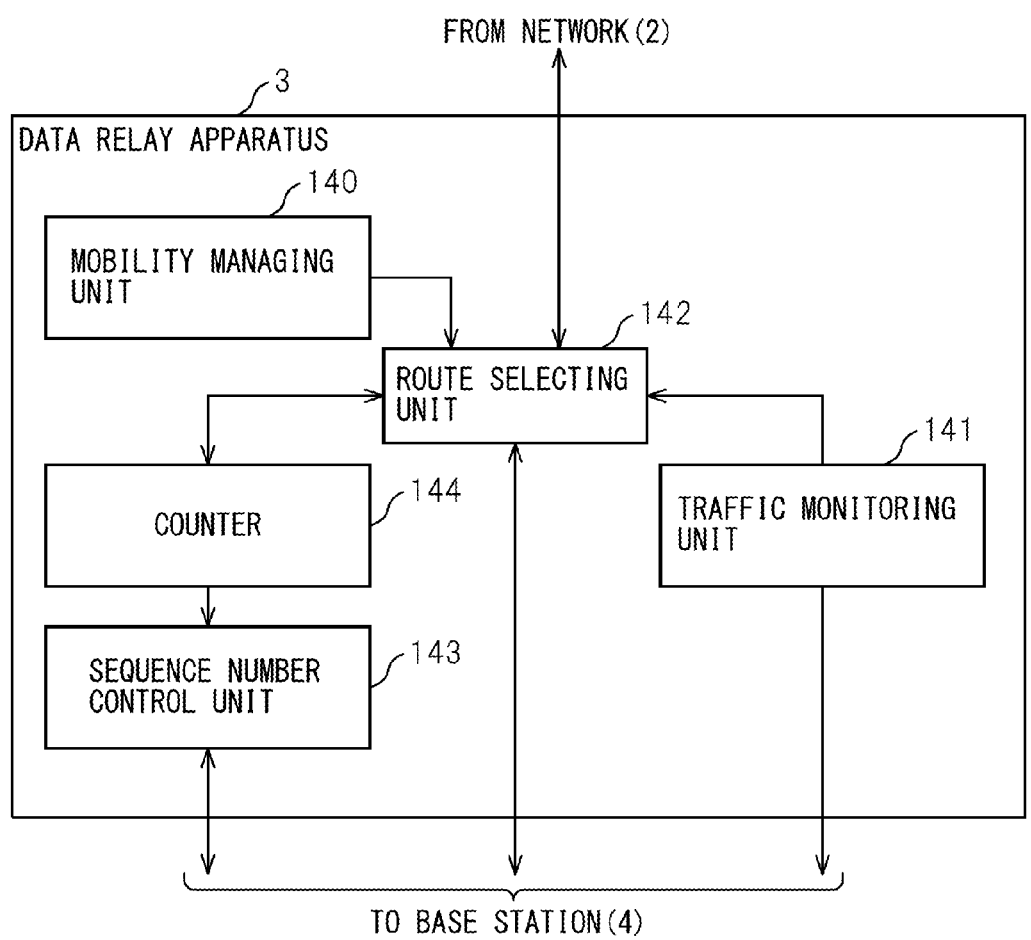
FIG. 11 is a view which illustrates an example of the configuration of a data relay apparatus.

FIG. 11 is a view which illustrates an example of the configuration of the data relay apparatus 3. The data relay apparatus 3 is provided with a mobility managing unit 140, status monitoring unit 141, route selecting unit 142, sequence number control unit 143, and counter 144. The processings of the mobility managing unit 140, status monitoring unit 141, route selecting unit 142, sequence number control unit 143, and counter 144 are performed by the processor 130.

The mobility managing unit 140 manages the route information of the routes, for the respective mobile terminals 5, which can be selected for transferring the data received from the network 2 and sent to the mobile terminal 5. The route information is generated, when the connection of the service with the mobile terminal 5 is established or when a base station 4, through which data from the data relay apparatus 3 to the mobile terminal 5 is transferred, is newly added by the carrier control unit 87 of the base station 4.

The status monitoring unit 141 monitors a predetermined status of the base stations 4 which is reported from the status notifying units 84 of the base stations 4. The route selecting unit 142 selects a route to be used for data transfer, among the routes, held in the mobility managing unit 140, which can be selected for transfer of data to the mobile terminal 5, based on the predetermined status of the base stations 4. For example, the route selecting unit 142 selects a route which transfers data through a base station 4 with a relatively light load.

The sequence number control unit 143 performs processing for managing sequence numbers which are added to transferred data, in the PDCP sublayer. For example, the sequence number control unit 143 may perform processing for synchronizing the values of sequence numbers which are stored in the memories 78 in the different base stations 4a and 4b, respectively, through which different data from the different base stations may be transferred from the data relay apparatus 3 to the same mobile terminal 5. The sequence number control unit 143 may transmit, to one base station 4a, a sequence number request signal which makes the base station transmit the value of the sequence number stored in the memory 78 to the data relay apparatus 3. Further, the sequence number control unit 143 may make the other base station 4b rewrite the sequence number stored in the memory 78 with the sequence number which is obtained from one base station 4a according to the sequence number request signal.

In one embodiment, the sequence number control unit 143 may generate sequence number basic information which is used for determination of the sequence numbers at the PDCP sublayer of the base station 4 and notify it to the base station 4 along with the data transfer. The sequence number basic information, transmitted along with the data transferred to one base station 4a, may have a value corresponding to the data order between the data transmitted to the mobile terminal 5 through the base station 4a and another data transferred to the mobile terminal 5 through the other base station 4b before that data through the base station 4a. By referring to the sequence number basic information, the base station 4a can determine the sequence numbers of data in accordance with the data order from the data relay apparatus 3 between the data which is transmitted from the data relay apparatus 3 to the base station 4a and the data which is transmitted to the other base station 4b before that data through the base station 4a. For this reason, even if a plurality of data are transferred to the mobile terminal 5 along the routes through different base stations 4, it becomes possible to give sequence numbers to the data which correspond to the data order.

The sequence number control unit 143 may determine the data order of data transferred from the data relay apparatus 3, for example, in accordance with the reception order by which the data relay apparatus 3 receives data from the network 2. Further, the sequence number control unit 143 may determine the data order of the data transferred from the data relay apparatus 3 in accordance with information which is added to the data which is received from the network 2.

For example, the sequence number basic information may be the cumulative value of the amount of data or number of packets which are transferred to the mobile terminal 5 through another base station other than the base station 4a, during the period from when transferring the previous data to when transferring the current data through the base station 4a to the mobile terminal 5. Further, the sequence number basic information may be the cumulative value of the amount of data or number of packets which are transferred to the mobile terminal 5 during the period from when starting transferring a series of data from the data relay apparatus 3 to the mobile terminal 5 to when transferring the current data. The value of the sequence number basic information which is determined in this way becomes a value which differs according to the reception order by which the data relay apparatus 3 receives, from the network, the data which is transferred from the data relay apparatus 3 to the base station 4a and the data which is transferred to another base station 4b before that data to the base station 4a. The counter 144 counts the cumulative value of the amount of data or number of packets which are transferred to the mobile terminal 5.

5. Processing for Routing

Figure 12:
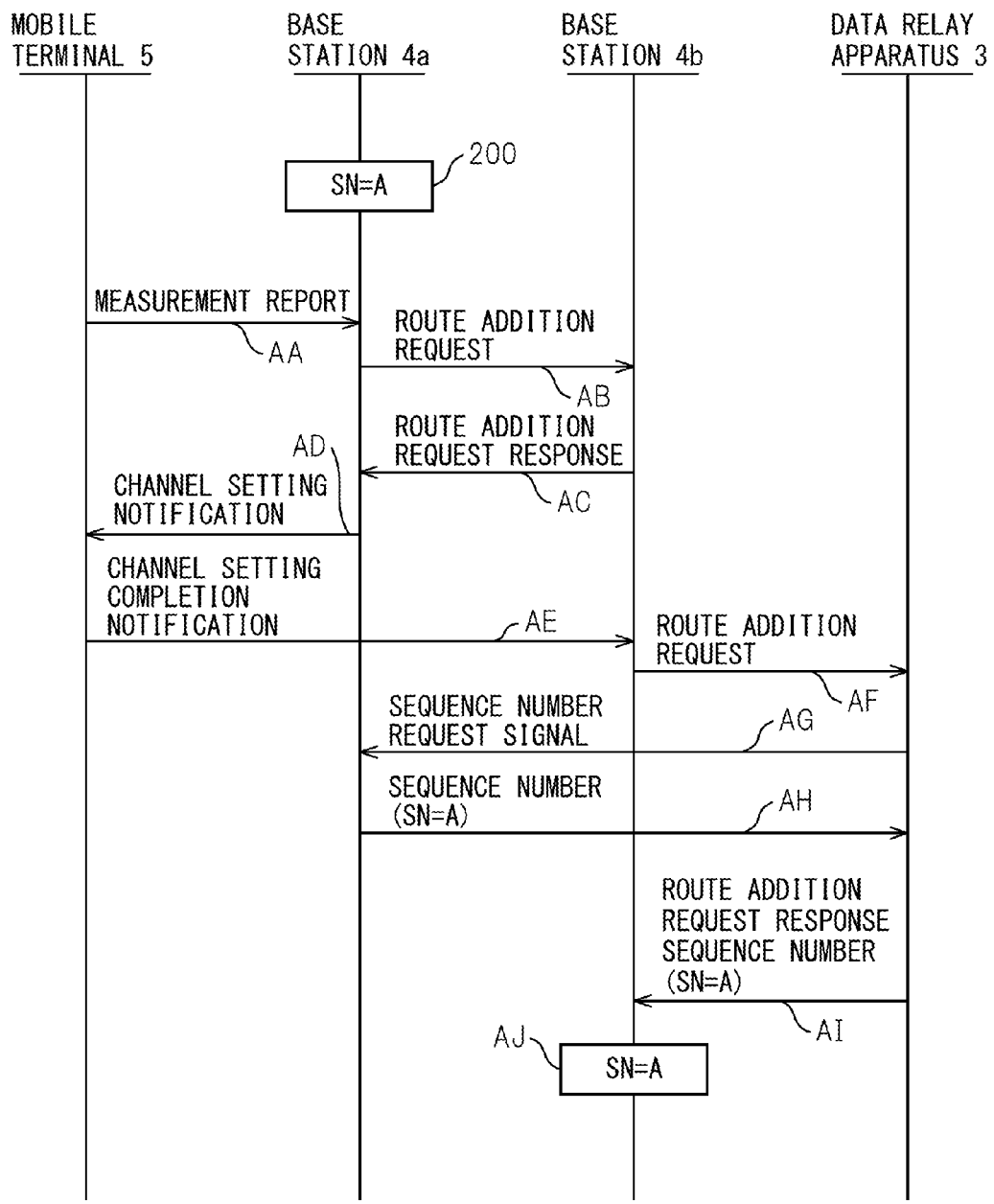
FIG. 12 is an explanatory view of processing for routing.

Next, one example of the processing for routing for transfer of different data from the data relay apparatus 3 through the plurality of base stations 4 to the same mobile terminal 5 will be explained. FIG. 12 is an explanatory view of the processing for routing. In the following explanation, assume the case where the data relay apparatus 3 is transferring data through the base station 4a to the mobile terminal 5 and in that state another route is newly added which passes through the base station 4b. Note that, in another embodiment, the operations of the following operations AA to AJ may also be steps.

Figure 13:
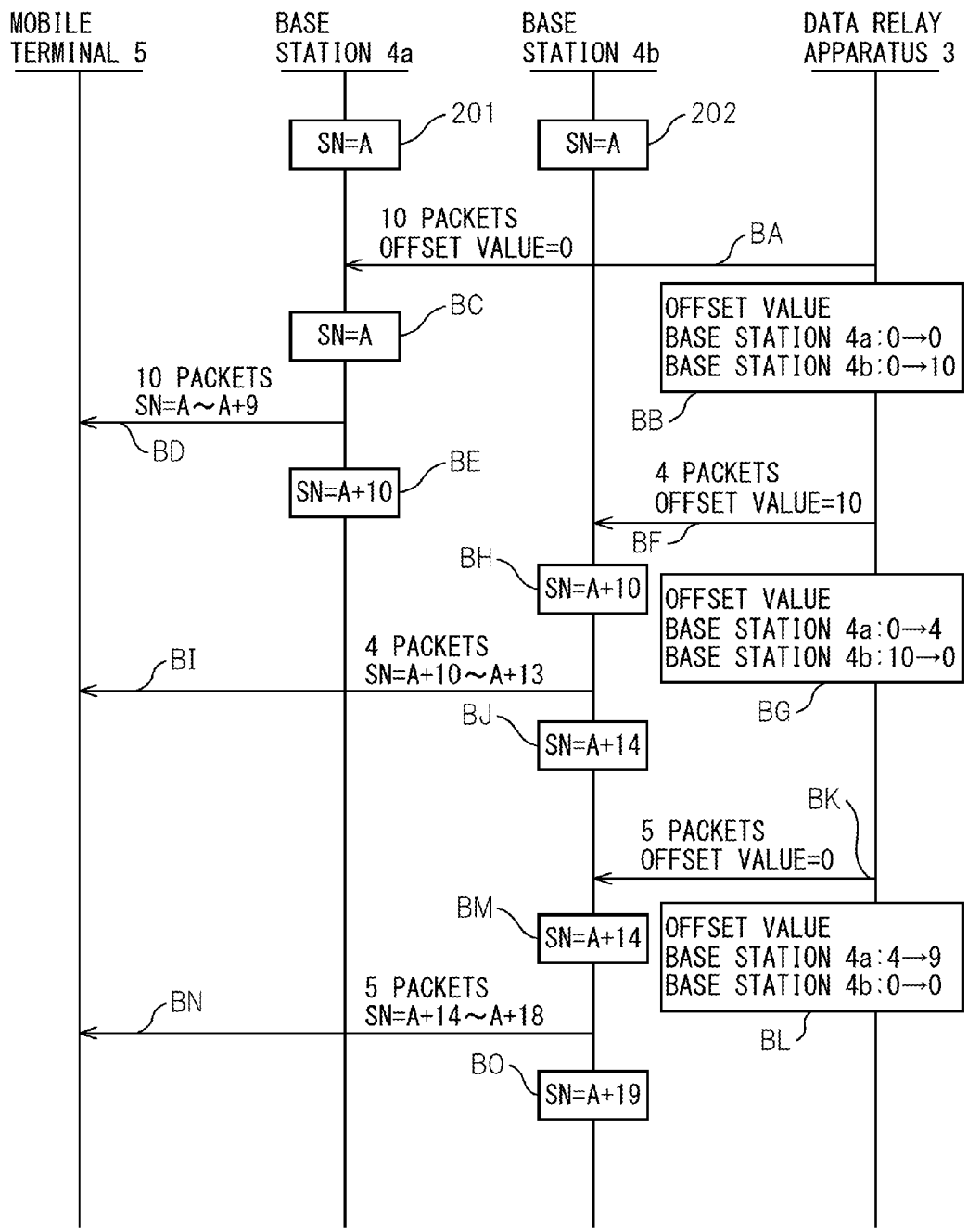
FIG. 13 is a view which illustrates an example of the configuration of a data relay apparatus.

Reference numeral 200 indicates the value of a sequence number which is stored in the memory 78 of the base station 4a. The value of the sequence number, right before adding new route, is "A". At the operation AA, the layer 3 processing unit 33 of the mobile terminal 5 measures the amount of traffic which the mobile terminal 5 handles and reports the result to the base station 4a. The carrier control unit 87 of the base station 4a judges whether it is possible to increase the physical channels which are allocated to the mobile terminal 5 in accordance with the amount of traffic of the mobile terminal 5. In FIG. 12 and FIG. 13, the sequence number is indicated as "SN".

When increasing the physical channels which are allocated to the mobile terminal 5, the carrier control unit 87 of the base station 4a judges whether to newly add a route passing through the base station 4b. When adding a route which passes through the base station 4b, at the operation AB, the carrier control unit 87 of the base station 4a notifies a route addition request to the other base station 4b.

When the base station 4b can transfer data from the data relay apparatus 3 to the mobile terminal, at the operation AC, the carrier control unit 87 of the base station 4b notifies the base station 4a of a route addition request response which informs execution of data transfer processing. At this time, the carrier control unit 87 of the base station 4b notifies the base station 4a of the physical channel resources which the base station 4b allocates to the mobile terminal 5.

Note that, at the operations AB and AC, the carrier control units 87 of the base stations 4a and 4b may perform resource allocation processing which makes the wireless frequencies different, which are used for transfer of data to the mobile terminal 5, between the base stations 4a and 4b. In one embodiment, the carrier control unit 87 of the base station 4a may notify, in the route addition request, the base station 4b of the wireless frequency which the base station 4a uses. The carrier control unit 87 of the base station 4b allocates to the mobile terminal 5 physical channel resources of a frequency which differs from the wireless frequency which the base station 4a uses. In another embodiment, when the base station 4a receives a route addition request response, physical channel resources of a frequency which differs from the frequency which the base station 4b uses may be allocated to the mobile terminal 5. By such resource allocation processing, Inter-eNB carrier aggregation which simultaneously transmits different data from the base stations 4a and 4b through a plurality of carriers becomes possible.

At the operation AD, the layer 3 processing unit 83 of the base station 4a notifies the mobile terminal 5 of the physical channel resources which the base station 4b allocates to the mobile terminal 5. When the base station 4a re-allocates the resources, the layer 3 processing unit 83 notifies the physical channel resources which the base station 4a allocates to the mobile terminal 5, in accordance with need.

At the operation AE, the layer 3 processing unit 33 of the mobile terminal 5 sets the notified physical channels and notifies the base station 4b of the completion of setting of the physical channels. At the operation AF, the base station 4b requests addition of a data transfer route to the data relay apparatus 3. The route selecting unit 142 of the data relay apparatus 3, which receives the route addition request, adds a route passing through the base station 4b to the data transfer-use routes for transfer of data to the mobile terminal 5.

At the operation AG, the sequence number control unit 143 of the data relay apparatus 3 transmits, to the sequence number control unit 85 of the base station 4a, a sequence number request signal for referring to the value of the sequence number stored in the memory 78. At the operation AH, the sequence number control unit 85 notifies the value "A" of the sequence number to the sequence number control unit 143 of the data relay apparatus 3.

At the operation AI, the sequence number control unit 143 of the data relay apparatus 3 transmits the designated value "A" of the sequence number to the sequence number control unit 85 of the base station 4b. At the operation AJ, the sequence number control unit 85 rewrites the sequence number stored in the memory 78 to the designated value "A". Due to these operations AG to AJ, the synchronization processing of sequence numbers between the different base stations 4a and 4b is completed.

Note that, the above synchronization processings AG to AJ are an example of the case where the base station 4a is already communicating with the mobile terminal 5 and a new base station 4b is added. For example, however, sometimes there is no existing route where a plurality of routes are set at the time of session start simultaneously. In this case, it is possible to select any one of the base stations 4 of the plurality of routes set simultaneously for transmitting the sequence number request signal, and match the sequence number of the other base station 4 with the sequence number of this base station 4.

6. First Example of Control of Sequence Numbers

Next, control of the sequence numbers which are given to the data passing through the above base stations 4a and 4b will be explained. In the example of the following explanation, the sequence number control unit 143 of the data relay apparatus 3 generates offset values, as sequence number basic information, that is, correction amounts by which the sequence number control unit 85 corrects the sequence numbers given by the base stations 4. FIG. 13 is an explanatory view of the processing of the sequence number control. Note that, in another embodiment, the operations of the following operations BA to BO may also be steps.

Reference numerals 201 and 202 indicate values of sequence numbers which are stored in the memories 78 of the base stations 4a and 4b. By the synchronization processings AG to AJ which are illustrated in FIG. 12, the values of the sequence numbers, which are stored in the memories 78 of the base stations 4a and 4b, are set to the same value "A". Further, when performing the synchronization processings AG to AJ, the sequence number control unit 143 sets both the offset value for the base station 4a and the offset value for the base station 4b to "0".

At the operation BA, the data relay apparatus 3 transfers 10 sets of packet data to the base station 4a, which are received from the network 2. At this time, the sequence number control unit 143 transmits the offset value "0" to the base station 4a. At the operation BB, the sequence number control unit 143 sets the offset value, stored for the base station 4a to which the packet data is transferred, to "0" and increases the offset value, stored for the base station 4b to which the packet data has not been transferred, to "10", so as to change the offset value to "10".

At the operation BC, the sequence control unit 85 of the base station 4a adds the offset value, transmitted from the data relay apparatus 3, to the value "A" of the sequence number stored in the memory 78, so as to correct the sequence number. In this case, the offset value is "0", so the value of the sequence number does not change. At the operation BD, the base station 4a transfers 10 sets of packet data to the mobile terminal 5, which are transferred to the data relay apparatus 3. At this time, the layer 2 processing unit 82 of the base station 4a gives the 10 sets of packet data respectively the 10 sequence numbers "A" to "A+9" starting from the value "A" stored in the memory 78. By the 10 sets of packet data being given the sequence numbers, the value of the sequence number which is stored in the memory 78 is updated to "A+10", at the operation BE.

At the operation BF, the data relay apparatus 3 transfers four sets of packet data received from the network 2 to the base station 4b. At this time, the sequence number control unit 143 transmits, to the base station 4b, the offset value "10" for the base station 4b. At the operation BG, the sequence number control unit 143 sets the offset value stored for the base station 4b, to which the packet data is transferred, to "0" and increases the offset value stored for the base station 4a, to which the packet data is not transferred, by "4" so as to change the value to "4".

At the operation BH, the sequence control unit 85 of the base station 4b performs correction to add the offset value "10", which is transmitted from the data relay apparatus 3, to the value "A" of the sequence number stored in the memory 78. At the operation BI, the base station 4b transfers four sets of packet data which are transferred from the data relay apparatus 3 to the mobile terminal 5. At this time, the layer 2 processing unit 82 of the base station 4b gives the four sequence numbers "A+10" to "A+13", which start from the value "A+10" stored in the memory 78, to the four sets of packet data respectively. By the four packet data being given the sequence numbers, the value of the sequence number stored at the memory 78 is updated to "A+14", at the operation BJ.

At the operation BK, the data relay apparatus 3 transfers five sets of packet data received from the network 2 to the base station 4b. At that time, the sequence number control unit 143 transmits, to the base station 4b, the offset value "0" for the base station 4b. At the operation BL, the sequence number control unit 143 sets the offset value stored for the base station 4b, to which the packet data is transferred, to "0" and increases the offset value stored for the base station 4a, to which this packet data has not been transferred, by "4" so as to change the value to "9".

At the operation BM, the sequence control unit 85 of the base station 4b performs correction by adding the offset value, transmitted from the data relay apparatus 3, to the value "A+14" of the sequence number stored in the memory 78. In this case, the offset value is "0", so the value of the sequence number does not change. At the operation BN, the base station 4b transfers five sets of packet data transferred from the data relay apparatus 3 to the mobile terminal 5. At this time, the layer 2 processing unit 82 of the base station 4b gives the five sequence numbers "A+14" to "A+18", starting from the value "A+14" stored in the memory 78, to four sets of packet data respectively. By the sequence numbers being given to five sets of packet data, the value of the sequence number stored in the memory 78 at the operation BO is updated to "A+19.

By controlling the sequence numbers in the above way, consecutive sequence numbers are added to a series of packet data which is transferred by a plurality of routes passing through the base stations 4a and 4b. As a result, according to this embodiment, even if the order of arrival of the data transferred over different routes differs from the correct data order, the mobile terminal 5 receiving the packet data can accurately correct the order of the received data.

Note that, in the above explanation, the case where there are two base stations 4 passing a series of data simultaneously was explained, but even when there are three or more base stations 4 passing the series of data simultaneously, it is possible to similarly determine the sequence numbers. For example, consider the case where data is transferred through three or more, that is, n number of, base stations 4 to the same mobile terminal 5. The offset value which is transmitted to one base station 4 may be determined as the cumulative value of the numbers of packets which pass through the other (n−1) number of base stations 4 during the period from when transferring previous data through this base station 4 to when transferring the current data.

Further, in another embodiment, the sequence number control unit 143 of the data relay apparatus 3 may use the sequence numbers, as the sequence number basic information, instead of the offset values. The sequence number control unit 143 may transmit, as the sequence number basic information, the sequence numbers of the head packets of the plurality of packet data to be transferred to the base stations 4. When the sequence control unit 85 of the base station 4b receives the sequence numbers, the sequence numbers stored in the memory 78 may be rewritten by the received sequence numbers.

7. Regarding Setting of Logical Channels

Next, the operation for setting the logic channels between the base stations 4 and mobile terminal 5 will be explained. By using the processing for control of the sequence numbers of the present embodiment to control the PDCP sequence numbers to be given to the data at the PDCP sublayer, it is possible to match the order of the PDCP sequence numbers of the data, passing through different routes, with the inherent order of data.

Here, the PDCP sequence numbers and the RLC sequence numbers given to the data at the RLC sublayer are independently determined. Therefore, if the same logical channel is allocated to different routes passing through the base stations 4a and 4b, the RLC sequence numbers given by these base stations 4a and 4b independently, will become mixed at the mobile terminal 5, so accurate correction of the order becomes impossible at the RLC sublayer.

For this reason, in one embodiment, different logical channels are allocated for the respective routes for simultaneous transfer of different data transmitted from the data relay apparatus 3 to the same mobile terminal 5 through the plurality of base stations 4. When the carrier control units 87 of the plurality of base stations 4 through which the data passes add new routes at the operations AB and AC which are illustrated in FIG. 12, it is also possible to perform processing to set the logical channels so that the logical channels between the plurality of base stations 4 and mobile terminal 5 become different logical channels. The carrier control units 87 may also notify the settings of the logical channels to the mobile terminal 5, when the layer 3 processing units 83 notify the physical channel resources to the mobile terminal 5, at the operation AD illustrated in FIG. 12.

The MAC receiving unit 60 of the mobile terminal 5 separates the received data for the respective logical channels allocated corresponding to the plurality of base stations 4 through which the data passes. The data passing through the plurality of base stations 4 are separately processed by the RLC receiving unit 61. The PDCP receiving unit 62 combines the data passing through the plurality of base stations 4 separated for the respective logical channels and corrects the order in accordance with the sequence numbers.

In this way, by separating the logical channels for the respective base stations of the plurality of base stations 4 through which the data passes, even if the data is transferred by different routes, it becomes possible for the base stations 4 of the different routes to add RLC sequence numbers independently.

8. Second Example of Control of Sequence Numbers

Next, another example of control of the sequence numbers will be explained. In one embodiment, the data relay apparatus 3 may transmit the sequence number basic information to the base stations 4 for the respective packet data. At this time, the data relay apparatus 3 may transmit the sequence number basic information to the base stations 4 separately from the packet data or added to the packet data.

In one embodiment, the layer 2 processing unit 82 of a base station 4 determines the sequence numbers to be added to the packet data in accordance with the sequence number basic information which is transmitted for the respective packet data and adds the determined sequence numbers to the packet data.

In another embodiment, the sequence number basic information may be the sequence numbers themselves. In this case, the layer 2 processing unit 82 of the mobile station 4 may store the sequence numbers transmitted from the data relay apparatus 3 at the headers of the packets. Alternatively, the route selecting unit 142 of the data relay apparatus 3 may directly store sequence numbers at the headers of the transmitted packet data.

In the present embodiment as well, when the order of arrival of packet data transferred by different routes differs from the correct order of data, the mobile terminal 5 can accurately correct the order of the received data.

All examples and conditional language recited hereinafter are intended for pedagogical purposes to aid the reader in understanding the principles of the invention and the concepts contributed by the inventor to furthering the art, and are to be construed as being without limitation to such specifically recited examples and conditions. Nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

REFERENCE SIGNS LIST

1 communication system
2 network
3 data relay apparatus
4, 4a, 4b base station
5 mobile terminal
14 digital signal processor
16 codec circuit
17 modulation circuit
18 wireless circuit
70, 130 processor

What is claimed is:

1. A communication system for transferring data from a data relay apparatus to a mobile terminal while adding, at a plurality of base stations, sequence number to the data to be transferred to the mobile terminal, wherein:

the data relay apparatus comprising a first processor which performs processing, when transferring a first data and second data received from a network and addressed to the mobile terminal through different base stations among the plurality of base stations, respectively, to transfer the first data received before the second data to one of the plurality of base stations and by adding information relating to reception order of the first and second data to the second data and transfer the second data with the information to another base station in the plurality of base stations which are held in a connection state with the mobile terminal simultaneously;

each of the plurality of base stations comprising a second processor which performs processing, when the information is added to the data transferred from the data relay apparatus, to add the sequence number based on the information to the data transferred and transmit the data with the sequence number to the mobile terminal; and the mobile terminal comprising a receiving unit which receives the data transmitted from each of the plurality of base stations;

said information relating to the reception order of said first and second data is an offset value which corresponds to an amount of the first data; and said first processor adds the offset value to said second data and transfers the second data and added offset value to said another base station.

2. The communication system according to claim 1, wherein each of said plurality of base stations comprising a memory which stores a value of the sequence number to be added to the data, and said first processor synchronizes the values of the sequence numbers between the plurality of base stations.

3. The communication system according to claim 2, wherein said second processor, after the synchronization between the plurality of base stations, reflects the information relating to the reception order of the first data and second data to the value stored in said memory and determines the sequence number.

4. The communication system according to claim 1, wherein the mobile terminal comprising a third processor which performs a processing to separate the data received from said receiving unit into a plurality of different logical channels which correspond to the plurality of base stations, respectively, and a processing to correct an order of the data separated by the processing for separation in accordance with the sequence number.

5. The communication system according to claim 1, wherein said second processor performs a processing to allocate a resource to make a wireless frequency to be used for transferring the data to the mobile terminal.

6. A data relay apparatus in a communication system for transferring data from the data relay apparatus to a mobile terminal through a plurality of base stations, while adding a sequence number to the data to be transferred to the mobile terminal, the data relay apparatus comprising:

a processor which performs processing, when transferring a first data and second data received from a network and addressed to the mobile terminal through different base stations among the plurality of base stations, to transfer the first data received before the second data to one base station in the plurality of base stations which are held in a connection state with the mobile terminal simultaneously, and add information relating to reception order of the first and second data to the second data and transfer the second data with the information to another base station in the plurality of base stations;

said information relating to the reception order of said first and second data is an offset value which corresponds to an amount of the first data; and said processor adds the offset value to said second data and transfers the second data and the added offset value to said another base station.

7. A base station in a communication system for transferring data from a data relay apparatus to a mobile terminal while adding, at a plurality of base stations, a sequence number to the data to be transferred to the mobile terminal, the base stations comprising:

a processor which adds, in accordance with information relating to a reception order of a first data and second data, addressed to the mobile terminal, which are sent from a network and received at the data relay apparatus, a sequence number to the second data sent from the data relay apparatus and received at a second base station of said plurality of base stations after the reception of the first data at a first base station of said plurality of base stations and transmits the second data with the sequence number to the mobile terminal, the processor is included in each of the plurality of base stations which are held in a connection state with the mobile terminal simultaneously;

said information relating to the reception order of said first and second data is an offset value which corresponds to an amount of the first data; and a processor of said data relay apparatus adds the offset value to said second data and transfers the second data and the added offset value to another base station among the plurality of base stations.

8. A mobile communication system for transferring data from a data relay apparatus to a mobile terminal while adding, at a plurality of base stations, sequence number to the data to be transferred to the mobile terminal, the mobile terminal comprising:

a receiving unit which receives, one of a first data and a second data sent from a network and received at the data relay apparatus, the first data to which a sequence number is added by one base station of the plurality of base stations and receives the second data to which a sequence number is added by another base station of the plurality of base stations, where the one base station and the other base station are held in a connection state with the mobile terminal simultaneously; and a processor which corrects, in accordance with the sequence numbers added to the first and second data respectively, an order of the first and second data received, wherein the first data is a data, addressed to the mobile terminal, which is received at the data relay apparatus from the network before the reception of the second data at the data relay apparatus; and the sequence number added to the second data is a sequence number which is determined in accordance with information relating to reception order of the first data and second data received at the data relay apparatus;

said information relating to the reception order of said first and second data is an offset value which corresponds to an amount of the first data; and a processor of said data relay apparatus adds the offset value to said second data and transfers the second data and the added offset value to said another base station.

9. A method of transmitting data to a mobile terminal with a sequence number added to the data at a plurality of base stations when the data is transferred from a data relay apparatus to the mobile terminal through the plurality of base stations, the method comprising:

in the data relay apparatus,
transferring, when transferring a first data and second data, addressed to the mobile station, through different base stations, among the plurality of base stations, respectively, the first data, received before the second data, at one base station and transferring the second data, to which information relating to the reception order of the first and second data is added and transferred, to another base station;

in each of the plurality of base stations, which are held in a connection state with the mobile terminal simultaneously;
adding, when the information is added to the data transferred from the data relay apparatus, and transmitting the data with the sequence number to the mobile terminal; and in the mobile terminal
receiving the data transmitted from the plurality of base stations respectively;

said information relating to the reception order of said first and second data is an offset value which corresponds to an amount of the first data; and a processor of said data relay apparatus adds the offset value to said second data and transfers the second data and the added offset value to said another base station.

10. A method of communication of data in a communication system for transferring data from a data relay apparatus to a mobile terminal while adding, at a plurality of base stations, a sequence number to the data to be transferred to the mobile terminal, the method comprising:

transferring from the data relay apparatus, when transferring a first data and second data, received from a network and addressed to the mobile station, through different base stations, among the plurality of base stations which are held in a connection state with the mobile terminal simultaneously, respectively, the first data, received before the second data, at one base station of the plurality of base stations and transferring the second data, to which information relating to reception order of the first data and second data is added and transferred, to another base station of the plurality of base stations;

said information relating to the reception order of said first and second data is an offset value which corresponds to the amount of the first data; and a processor of said data relay apparatus adds the offset value to said second data and transfers the second data and the added offset value to said another base station.

11. A method of communication of data in a communication system for transferring data from a data relay apparatus to a mobile terminal while adding, at a plurality of base stations, a sequence number to the data to be transferred to the mobile terminal, the method comprising:

adding, in accordance with information relating to a reception order of a first data and second data, addressed to the mobile terminal, which are sent from a network and received at the data relay apparatus, the sequence number to the second data sent from the data relay apparatus and received at a base station of the plurality of base stations, which are held in a connection state with the mobile terminal simultaneously, after the reception of the first data; and transmitting the second data with the sequence number to the mobile terminal;

said information relating to the reception order of said first and second data is an offset value which corresponds to an amount of the first data; and a processor of said data relay apparatus adds the offset value to said second data and transfers the second data and the added offset value to another base station among the plurality of base stations.

12. A method of communication of data by a mobile terminal in a communication system for transferring the data from a data relay apparatus to the mobile terminal while adding, at a plurality of base stations, a sequence number to the data to be transferred to the mobile terminal, the method comprising:

receiving at mobile terminal, among a first data and second data sent from a network and received at the data relay apparatus, the first data to which a sequence number is added by one of the plurality of base stations which are held in a connection state with the mobile terminal simultaneously and receiving the second data to which a sequence number is added by other base station in the plurality of base stations, and correcting, in accordance with the sequence numbers added to the first and second data respectively, an order of the first and the second data received;

the first data is a data, addressed to the mobile terminal, which is received at the data relay apparatus from the network before the reception of the second data at the data relay apparatus;

the sequence number added to the second data is a sequence number which is determined in accordance with information relating to the reception order of the first data and second data received at the data relay apparatus;

said information relating to the reception order of said first and second data is an offset value which corresponds to an amount of the first data; and the offset value is added, by said data relay apparatus, to said second data and the second data added with offset value is transferred from the data relay apparatus to another base station among the plurality of base stations.

13. A communication system for transferring data from a data relay apparatus to a mobile terminal connected to a plurality of base stations, wherein, the data relay apparatus comprising
  a processor which performs processing, when transferring a first data and second data, different from the first data, received from a network and addressed to the mobile terminal through different base stations among the plurality of base stations, respectively, to reflect reception order of the first data and second data to by using information relating to the reception order of the first data and second data received at the data relay apparatus, transfer the first data to one base station and transfer the second data to another base station, the base stations are held in a connection state with the mobile terminal simultaneously; and the mobile terminal comprising
  a receiving unit which receives the first data through the one base station and also receives the second data through the other base station;

said information relating to the reception order of said first and second data is an offset value which corresponds to an amount of the first data; and said processor adds the offset value to said second data and transfers the second data and the added offset value to said another base station.

* * * * *